United States Patent [19]
Ferguson

[11] 4,173,036
[45] Oct. 30, 1979

[54] WAVY MIRROR TRANSMITTER OPTICS

[75] Inventor: Robert T. Ferguson, Ridgecrest, Calif.

[73] Assignee: The United States of America as represented by the Secretary of the Navy, Washington, D.C.

[21] Appl. No.: 853,776

[22] Filed: Nov. 21, 1977

[51] Int. Cl.² .................... F21V 7/09; F21V 7/14; G02B 5/10; G02B 17/00
[52] U.S. Cl. .................... 362/259; 350/293; 350/296; 362/296; 362/297; 362/347; 362/348
[58] Field of Search ............... 362/296, 297, 302, 304, 362/346, 347, 348, 259; 350/293, 296

[56] References Cited

U.S. PATENT DOCUMENTS

| | | | |
|---|---|---|---|
| 1,900,551 | 3/1933 | Guth | 362/348 |
| 3,476,930 | 11/1969 | Herman et al. | 362/296 |
| 3,518,419 | 6/1970 | Humphrey | 362/259 |
| 3,541,323 | 11/1970 | Stewart et al. | 362/259 |
| 3,645,606 | 2/1972 | La Vantine | 350/296 |
| 3,829,677 | 8/1974 | Dellano | 362/346 |
| 3,972,598 | 8/1976 | Kunz | 350/293 |
| 4,030,816 | 6/1977 | Belke | 350/293 |
| 4,034,217 | 7/1977 | Dumont | 362/297 |
| 4,087,682 | 5/1978 | Kolodziej | 362/297 |

FOREIGN PATENT DOCUMENTS

| | | | |
|---|---|---|---|
| 2249572 | 4/1974 | Fed. Rep. of Germany | 362/347 |
| 1192272 | 5/1970 | United Kingdom | 362/346 |
| 1233333 | 5/1971 | United Kingdom | 350/296 |

OTHER PUBLICATIONS

Sletten, C. J. et al, Applied Optics, vol. 4, No. 10, pp. 1239–1251 (1965).

*Primary Examiner*—Benjamin R. Padgett
*Assistant Examiner*—T. S. Gron
*Attorney, Agent, or Firm*—R. S. Sciascia; W. Thom Skeer; K. G. Pritchard

[57] ABSTRACT

A single reflecting transmitter with improved performance capabilities. The improved performance is achieved by using a modified surface called a wavy mirror. The wavy mirror has its focal distance a function of the angle measured around the axis of revolution. The wavy mirror is designed to reflect light into a predetermined pattern of controlled size and energy distribution. The reflection is oriented so that the light source does not obscure the reflected beam.

7 Claims, 8 Drawing Figures

WAVY MIRROR TRANSMITTER OPTICS

BACKGROUND OF THE INVENTION

1. Field of the Invention

This invention pertains to optical transmission systems. In particular it refers to single reflective mirror transmission systems which use a reflective surface to focus the light source into a predetermined pattern.

2. Description of the Prior Art

A mirror of unconventional optical design has been used for some years as the principal optical component of a passive infrared target detector. The practical experience gained through the use of this optical design concept and passive receiver generated the high level of confidence in the variations inherited in the design geometry. Beyond the configuration used in passive receivers, little documented evidence existed in support of design potential for other applications. The original studies performed led to the concept of the bullet mirror. The bullet mirror provided a way of funneling light from given sources into a modified output beam.

Limitations of the bullet mirror were principally the following:

1. The interaction of the laser diode and the bullet mirror was shown analytically and experimentally to affect a reduced efficiency from vignetting of the laser diode light emissions imposed by the alignment geometry required to achieve the necessary azimuthal coverage in the projected light beam.

2. The bullet mirror could not fully collect the laser diode emissions and maintain the required azimuthal coverage in the projected conical sector of light.

3. The inconsistancies from one laser diode to another in their raw light emission spatial characterictics appears to introduce considerable alignment problems. The difficulties observed with the laser diodes seemed to be resolvable only by a tedious sorting of diodes.

These numerated difficulties and others were sufficient to justify new ideas for the transmitter design. Modifying the mirror itself appeared to be more profitable than modifying the laser diode. In an effort to extend the basic concept of the single reflecting transmitter, innovations in the bullet mirror concept were addressed.

A modified paraboloidal mirror was seen to be analytically possible in that it would overcome the deficiencies of the earlier bullet mirror transmitter designs. The modified mirror would retain the basic beam shaping properties that had been demonstrated feasible with a single mirror. The paraboloidal transmitter was shown analytically to have considerably improved performance capabilities when the focal distance was made a function of the angle measured around the axis of revolution. This modified surface is the wavy mirror.

SUMMARY OF THE INVENTION

The wavy mirror is a modification of the bullet mirror so that the surface equation is a function of the azimuth angle. A computer program was produced to eliminate the need for formal expressions for the normal-to-the-surface at any point of the surface. The surface equation is expressed in polar coordinates, a natural coordinate system for the wave mirror. Additionally, the light source model was improved over previous models to allow greater analytic flexibility.

The wavy mirror analysis is vastly simplified compared to that of the bullet mirror for two reasons. First, the surface equation was very conveniently expressed in polar coordinates. Second, a special computer program has been deliberately written so that polar-to-rectangular coordinate system transformations are automatically handled. These two departures from conventional ray tracing computer programs allow the analysis to proceed smoothly.

The use of a computer program permits iterant searches of light source rays to be made to determine the appropriate surface for each ray to be reflected into the predetermined beam shape. The degree of efficiency required is controlled by the number or rays traced.

The wavy mirror is developed to permit the electrical energy distribution of a nonsymmetrical light source, such as a typical laser diode to be emitted upon reflection from the mirror surface into a fan of light of controlled side and energy distribution. This overcomes the inherent problem of nonsymmetrical light sources which have significant variations in the intensity distribution of light emitted from them. The mirror is also designed to allow the light source to not be in the path of the reflected light. This placement avoids obscuration which wastes light. An object of the invention is to provide a single reflective system capable of projecting light beams of predetermined shape and intensity distributions. A further object of the invention is to provide a reflective surface which provides such an output beam from a light source which does not obscure the projected light beam after reflection.

DESCRIPTION OF THE PREFERRED EMBODIMENT

Figure 1:
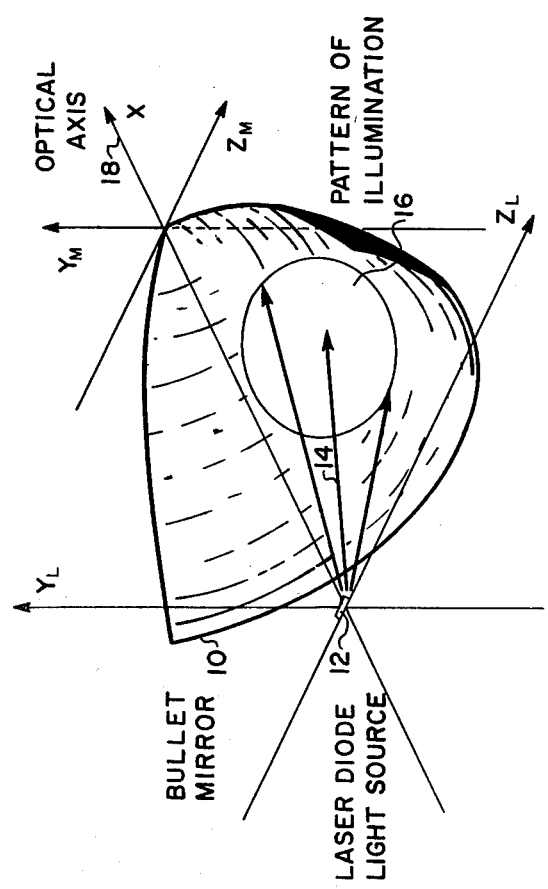
FIG. 1 is a drawing of the prior art bullet mirror.

FIG. 1 is a drawing of a bullet mirror 10 which is the prior art paraboloidal mirror that has been used previously. The nonsymmetrical source of light shown is a laser diode 12 whose light is shown by rays 14. Rays 14 strike bullet mirror 10 as shown. Light rays 14 create a pattern of illumination 16 which is reflected off the bullet mirror 10. As shown in FIG. 1, the bullet mirror can be described in rectangular coordinates by an optical axis 18 as a paraboloidal revolution.

Figure 2:
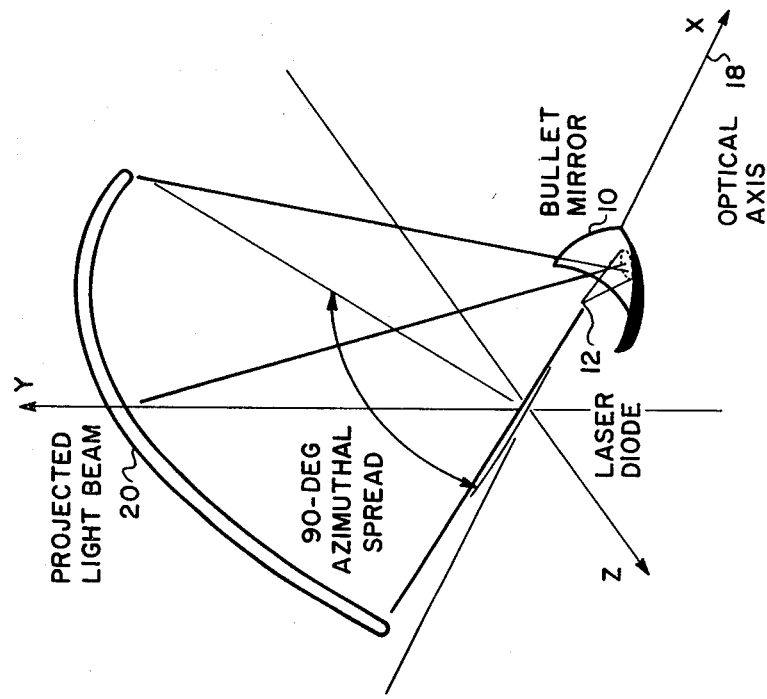
FIG. 2 is an idealized drawing showing how the prior art bullet mirror should work.

FIG. 2 is another example of the prior art. The view is a bullet mirror 10 and laser diode 12 around their rectangular coordinate system with optical axis 18. By being of greater perspective, FIG. 2 shows the projected light beam 20 which carries a 90° azimuthal spread. As noted previously in the background section of this disclosure, there were severe restrictions on the use of laser diode 12 and bullet mirror 10 which prevented projected light beam 20 from being as well defined as shown in FIG. 2. It is due to these restrictions that it is necessary to have a better reflective surface than bullet mirror 10. The equation for a standard parabola in rectangular coordinates becomes extremely tedious upon translation and rotation of the coordinates. Since the algebra of ray tracing involves the use of straight lines in three dimensional space and an existing computer program had been used to analyze the bullet mirror, the constraints of the rectangular coordinate system were tolerated in the analysis of that optical system. However, the equation of a parabola can be expressed concisely in polar coordinate form. For this reason, spherical coordinates are used for the wavy mirror equation. This coordinate system greatly reduces the complexity of the analysis. Chained derivatives and a simple algorithm for transformation from spherical to rectangular coordinates are used to accomplish evaluation of the partial derivatives needed for the analysis without the necessity for expressing those derivatives formally.

Figure 3:
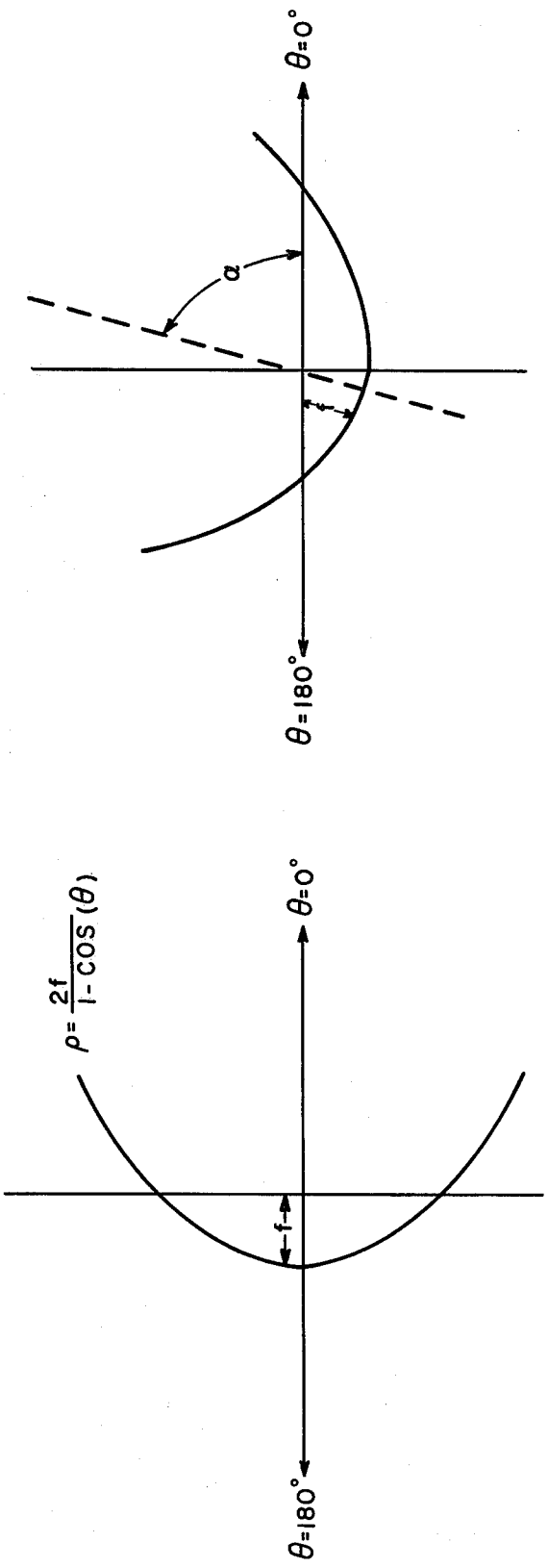
FIG. 3 shows a typical parabola in polar form.

FIG. 3 shows a parabola in polar form. The equation of a parabola with the focus at the origin and the curve open to the right in polar form is $$\rho = \frac{2f}{1 - \cos(\theta)}$$

In the above equation, $\rho$ is the radial coordinate, $\theta$ is the elevation coordinate of the spherical coordinate system and f is the focal distance of the parabola.

Figure 4:
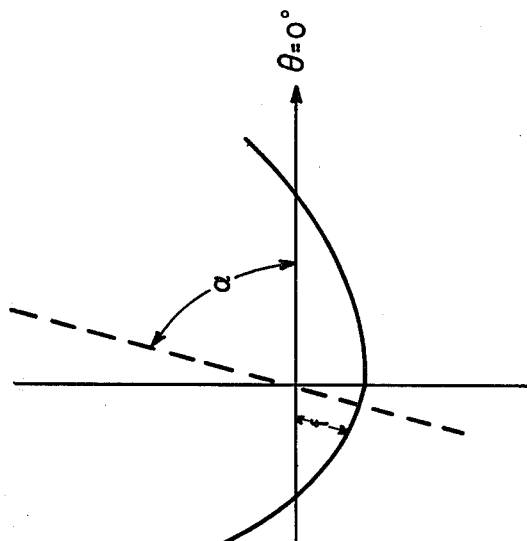
FIG. 4 shows a rotated parabola.

In order to properly orient the parabola for optical analysis of the wavy mirror, the curve must be rotated in the elevation sense by an angle $\alpha$. This rotation is shown in FIG. 4. The parabola in FIG. 3 has been rotated an angle $\alpha$ around the elevation coordinance axis $\theta$. The equation of the rotated parabola is now $$\rho = \frac{2f}{1 - \cos(\theta - \alpha)}$$

It can be seen that when $\theta = \alpha$, the axis of the parabola is specified. The equation is a proper expression for a surface in spherical coordinates where the surface is not a function of the azimuth angle, $\phi$. For any given value of $\theta$ and all values of the azimuth angle $\phi$, the value of $\rho$ is constant.

Modification of the bullet mirror design to incorporate a wavy surface involves making the focal distance of the parabola an oscillatory function of the azimuth angle $\theta$. If $f_o$ is the nominal focal distance and A is a modulation factor, then the focal distance f is expressed in terms of $\phi$ by using the following equation;

$$f = f_o\{1 + A[\cos(n\phi)]\}.$$

In this equation n specifies the number of oscillations per revolution about the azimuth axis. This equation expresses the amplitude modulation of the focal distance as a function of the azimuth angle.

As a further refinement, since beams spreading beyond some specified azimuth angle are not desired, an additional parameter can be introduced which attenuates the amplitude modulation as a function of azimuth angle. If $A_o$ is the nominal amplitude factor, E is a nominal exponent, which damps the amplitude of the wave as the value of $\rho$ increases and $\phi_o$ is the azimuth limit on the beam spread, the modulation factor can also become a function of the azimuth angle.

$$A = A_o[(\tfrac{1}{2})(1 + \cos(\pi\phi/\phi_o))]^E$$

After combining the equation for the modulation factor A and the equation for the focal distance f with the equation for the rotating parabola, the following equation results:

$$\rho = \frac{2f_o\{1 + A_o[(\tfrac{1}{2})(1 + \cos(\tfrac{\pi\phi}{\phi_0}))]^E \cos(\eta\phi)\}}{1 - \cos(\theta - \alpha)}$$

These equations are mere suggestions of the approach taken in this method. They do not represent anything more than one possible method of introducing the azimuth angle into the equation of the surface. This approach does, nevertheless, provide a means of generating a surface which analytically overcomes all the deficiencies of the bullet mirror.

Figure 5:
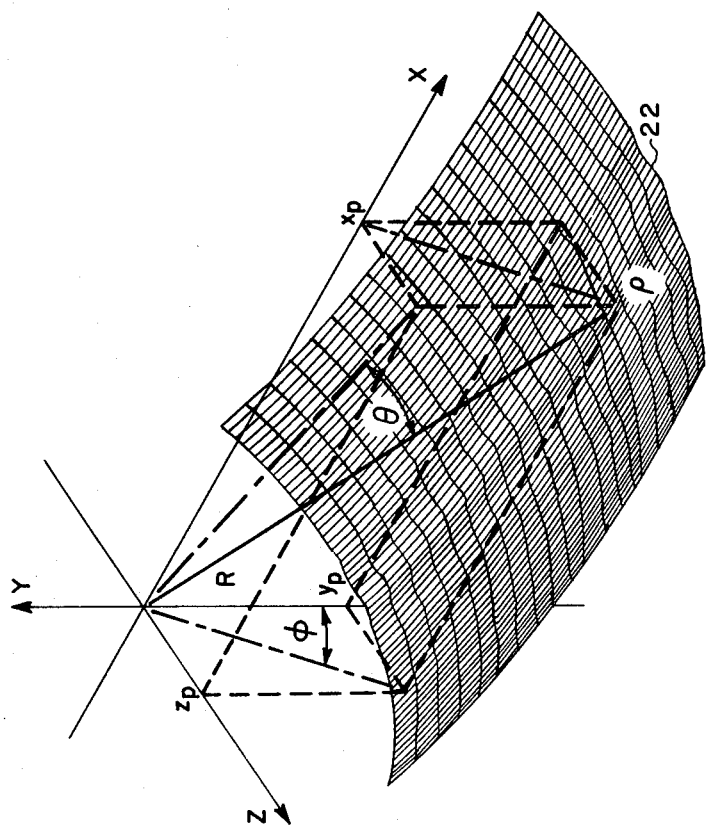
FIG. 5 illustrates a wavy mirror surface in both polar and rectangular coordinates.

FIG. 5 presents a definition of the coordinate system used in this analysis and shows a surface contoured to the equation derived above. The relation of $\rho$, $\theta$ and $\phi$ to wavy surface 22 is shown in FIG. 5. For the orientation shown in FIG. 5, the azimuthal axis is the Y axis.

Ray tracing analysis is normally done using rectangular coordinates exclusively. This choice of coordinates is natural since the manipulation of straight lines in three dimensional space most conveniently involves the use of direction cosines, which give the angular orientation for the line in space, and the coordinates of some convenient point on the line. The greater analytic difficulty encountered when working with nonstandard optical surfaces is that the point-of-intersection with a surface of a general line in space cannot readily be calculated. Fortunately, with the aid of computers, the point of intersection can be obtained rather easily using iterative searches along the line until the surface is intersected. A computer search as the one just described provides the appropriate values for the nominal factors $A_o$ and E shown in the equations for the surface of the wavy mirror.

The use of a single-reflective optic system imposes rather stringent geometric constraints on the light source used with that reflector. This suggests that the light source, such as a laser diode model, should be used which is as general as possible, so that all of the geometric considerations can be studied.

Figure 6:
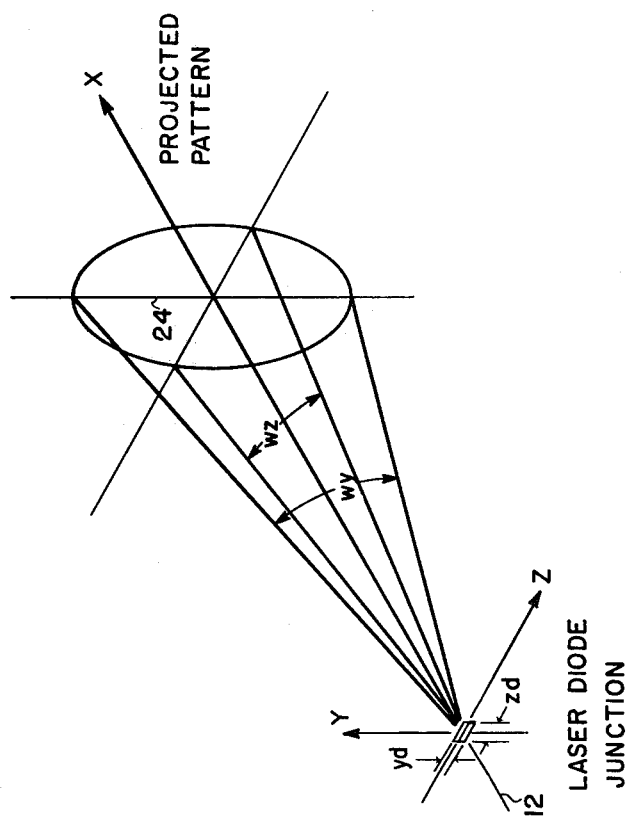
FIG. 6 shows the typical projection pattern of a laser diode light source.

In using the bullet mirror, the laser diode emissions were modeled as essentially rectangular light patterns, and the capabilities for positioning the light emitting junction very limited. Further study of the laser diode model shows the projected pattern is as shown in FIG. 6. FIG. 6 shows an elliptical rather than rectangular emission pattern. This is the pattern that was used in the laser diode model for the wavy mirror study and is more consistent with the patterns produced by single laser diodes. The laser diode emission beamwidth noted by the letters WZ and WY are used to define the axis of an elipse in the plane parallel to the plane of the light-emitting junction and separated from it by a suitable distance. The laser diode junction is assumed to have discrete values in the X and Y plane noted by the letter YD and ZD. It should be noted in FIG. 6 that major axis 24 of the projected elipse is perpendicular to the major rectangular axis of the laser diode junction 12. This is a common phenomenon due to the defraction pattern caused by the laser diode emission.

As can be seen in FIG. 6, the emitted light pattern can be described using two mutually perpendicular or orthogonal axes, Y and Z. The ellipse shown will have different intensity distributions in each of the quadrants about the Y and Z axes which will vary for each laser diode. Nonsymmetrical light souces other than the rectangular laser diodes shown will have different characteristic patterns.

Figure 7:
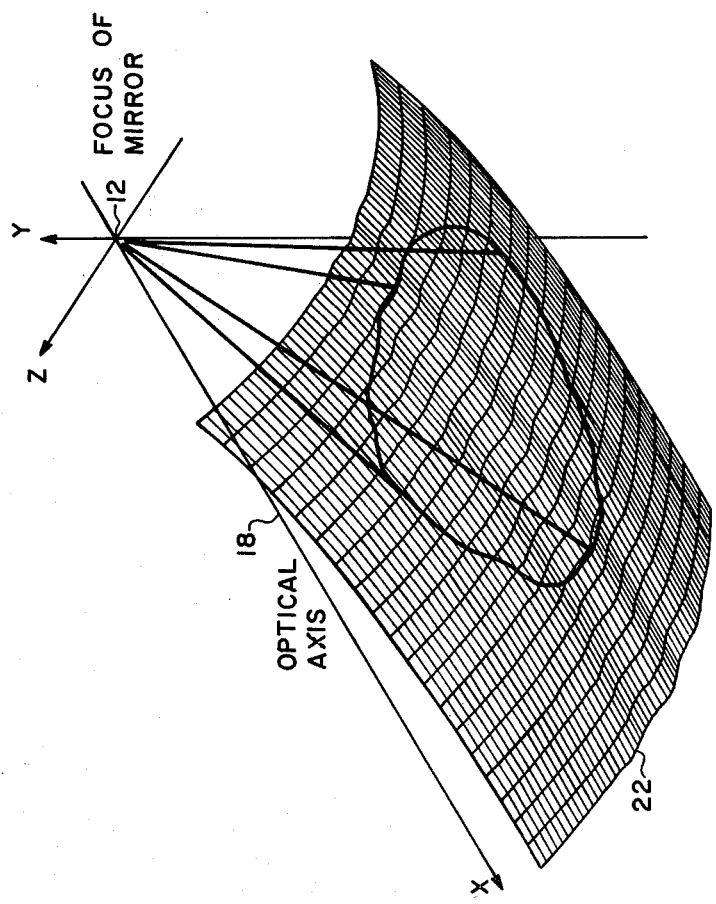
FIG. 7 shows the laser diode pattern projected on the wavy mirror.

FIG. 7 shows the wavy mirror surface 22 receiving the projected pattern from laser diode 12 which is located at the focus of the wavy mirror. To provide a comparison between the wavy mirror and the bullet mirror, rectangular axes are shown with optical axis 18, so that the wavy mirror can be compared with the bullet mirror shown in FIG. 1. The wavy mirror allows laser diode 12 to be placed so that it is not in the path of the reflected light. This avoids loss of light due to obscuration of the reflected light by the light source.

Figure 8:
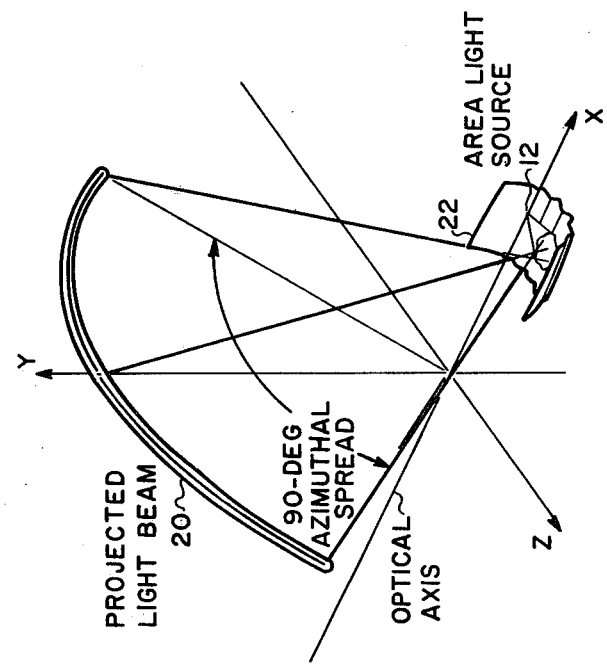
FIG. 8 shows the overall pattern of projected light in a wavy mirror transmitting system.

FIG. 8 is likewise shown to compare the transmitting system using a wavy mirror with that using a bullet mirror as shown in FIG. 2. Wavy surface 22 relects light source 12 into a projected beam 20. The beam can now be controlled without the limitations noted previously for the bullet mirror.

FIG. 8 is the complete embodiment of the present invention. Light source 12 illuminates reflective surface 22. Surface 22 is a wavy mirror whose shape has been determined by an iterant computer search. The actual shaping of surface 22 can be performed by using a computer programmed to map three-dimensional surfaces. The reflected light beam 20 is of predetermined characteristics and can be used in detectors. The shape shown is a thin conical fan of uniform intensity which can be used as a detection beam. Conical fans are desired in fuze systems because they are shaped the same as the path taken by exploding warheads.

The wavy mirror can be made by using a computer generated surface to make a mold. The mold is then used to cast the mirror surface. An alternative method of making the wavy mirror is to use a commercial toroidal polisher to make strips one-at-a-time and then join them together. The strip width would depend on the efficiency desired. The narrower the strips, the more efficient the mirror.

As can be seen from studying this disclosure other variations in determining such a wavy mirror surface are possible to produce the same desired effects.

What is claimed is:

1. A system for transmitting light beams in a desired intensity distribution pattern comprising:

a light source for emitting light, said emitted light in an intensity distribution pattern different from said desired intensity distribution pattern and where said emitted light intensity can be described with reference to two mutually perpendicular axes passing through said light source and where one of said axes is referred to as an azimuthal axis; and a reflecting surface placed in the path of said emitted light from said light source for changing said emitted light intensity distribution into said desired intensity distribution pattern where said reflecting surface has a contour described by the equation;

$$\rho = \frac{2f_o \{1 + A_o[(\frac{1}{2})(1 + \cos(\frac{\pi\phi}{\phi_0}))]^E \cos(\eta\phi)\}}{1 - \cos(\theta - \alpha)}$$

where
$\rho$ = radial coordinate,
$\theta$ = elevation coordinate,
$f_o$ = nominal focal distance,
$A_o$ = nominal amplitude,
$\phi$ = azimuth angle,
$\phi_o$ = azimuth limit of beam spread,
$\eta$ = number of oscillations per revolution about the azimuth axis,
$\alpha$ = angle of rotation, and
$E$ = exponential decay rate of the undulations of the surface.

2. A system of transmitting light beams as described in claim 1 where said light source is a laser diode.

3. A system for transmitting light beams in a desired intensity distribution pattern as described in claim 1 wherein said reflecting surface is contoured for a desired intensity distribution pattern which does not illuminate said light source.

4. A system for transmitting light beams in a desired intensity distribution pattern as described in claim 2 where said desired intensity distribution pattern is a uniform thin conical fan.

5. A system for transmitting light beams in a desired intensity distribution pattern as described in claim 1 where said desired intensity distribution pattern is a uniform thin conical fan.

6. A system for transmitting light beams in a desired intensity distribution pattern as described in claim 3 where said desired intensity distribution pattern is a uniform thin conical fan.

7. A system of transmitting light beams as described in claim 3 where said light source is a laser diode.

* * * * *